(No Model.) 3 Sheets—Sheet 1.

F. SCHMITT.
FENCE WIRE MACHINE.

No. 594,969. Patented Dec. 7, 1897.

WITNESSES
J. S. Bowen
Henry H. Byrne

INVENTOR:
Frank Schmitt,
by John Wedderburn
Attorney (No Model.) 3 Sheets—Sheet 2.

F. SCHMITT.
FENCE WIRE MACHINE.

No. 594,969. Patented Dec. 7, 1897.

WITNESSES
J. S. Bower,
Henry H. Byrne.

INVENTOR:
Frank Schmitt,
by John Wedderburn
Attorney (No Model.) 3 Sheets—Sheet 3.

F. SCHMITT.
FENCE WIRE MACHINE.

No. 594,969. Patented Dec. 7, 1897.

WITNESSES
J. S. Bowen
Henry H. Byrne

INVENTOR
Frank Schmitt,
by John Wedderburn
Attorney

THE NORRIS PETERS CO., PHOTO-LITHO., WASHINGTON, D. C.

United States Patent Office.

FRANK SCHMITT, OF CARLYLE, ILLINOIS.

FENCE-WIRE MACHINE.

SPECIFICATION forming part of Letters Patent No. 594,969, dated December 7, 1897.

Application filed December 15, 1896. Serial No. 615,725. (No model.)

*To all whom it may concern:*

Be it known that I, FRANK SCHMITT, a citizen of the United States, residing at Carlyle, in the county of Clinton and State of Illinois, have invented certain new and useful Improvements in Wire-Fence Machines; and I do hereby declare the following to be a full, clear, and exact description of the invention, such as will enable others skilled in the art to which it appertains to make and use the same.

My invention relates to fence-wire machines.

My object is to provide a machine of improved construction which can be drawn along and made to feed or pay out wire during the building of wire fences.

A further object is the provision of a machine of novel construction which will be adapted to reel in or take up fence-wire after the removal of the same from the post.

The foregoing and minor objects are accomplished by the provision of a machine comprising in its make-up certain improved devices whose construction, arrangement, and adaptation will be more fully set forth in the following description and appended claims.

Figure 1:
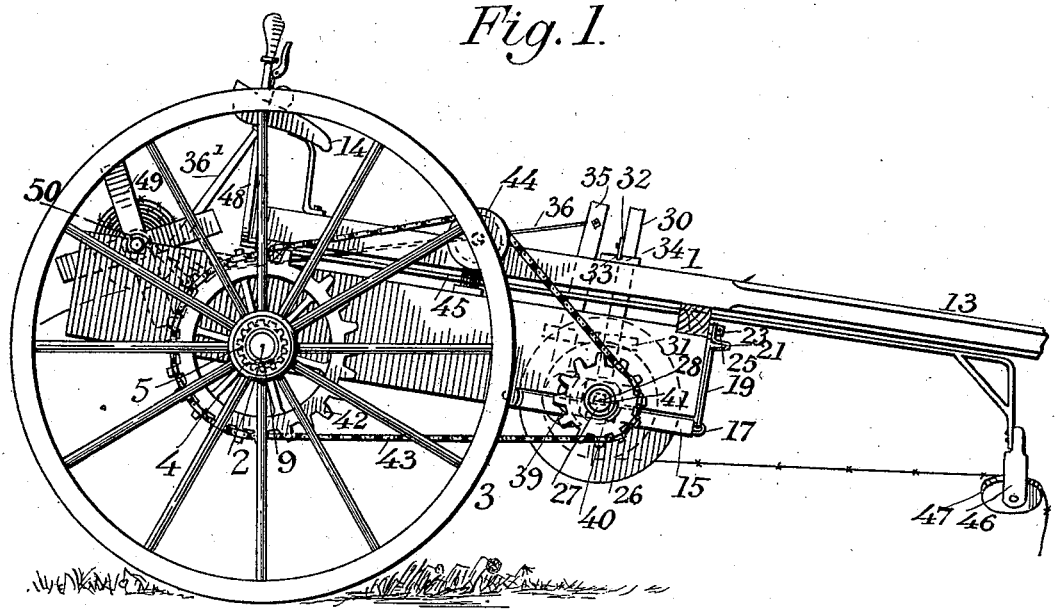
Figure 2:
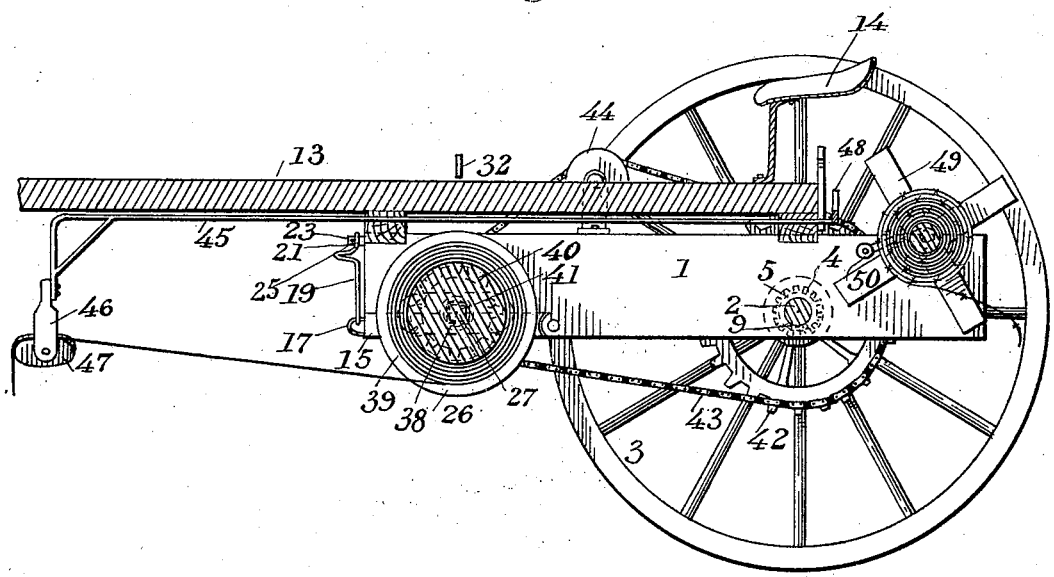
Figure 3:
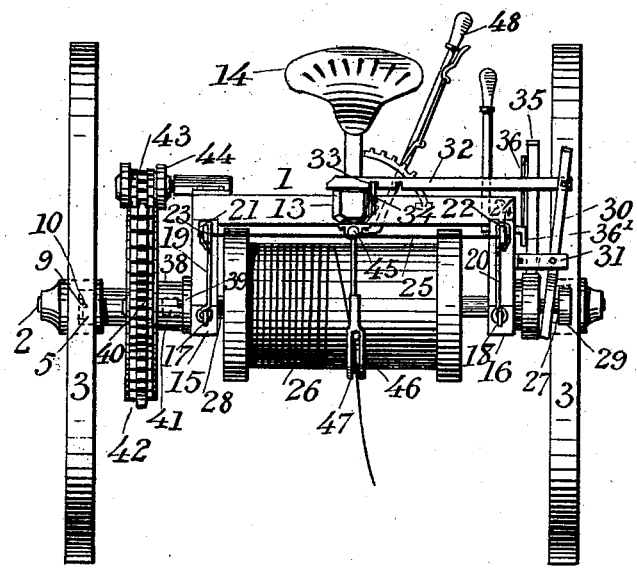
Figure 4:
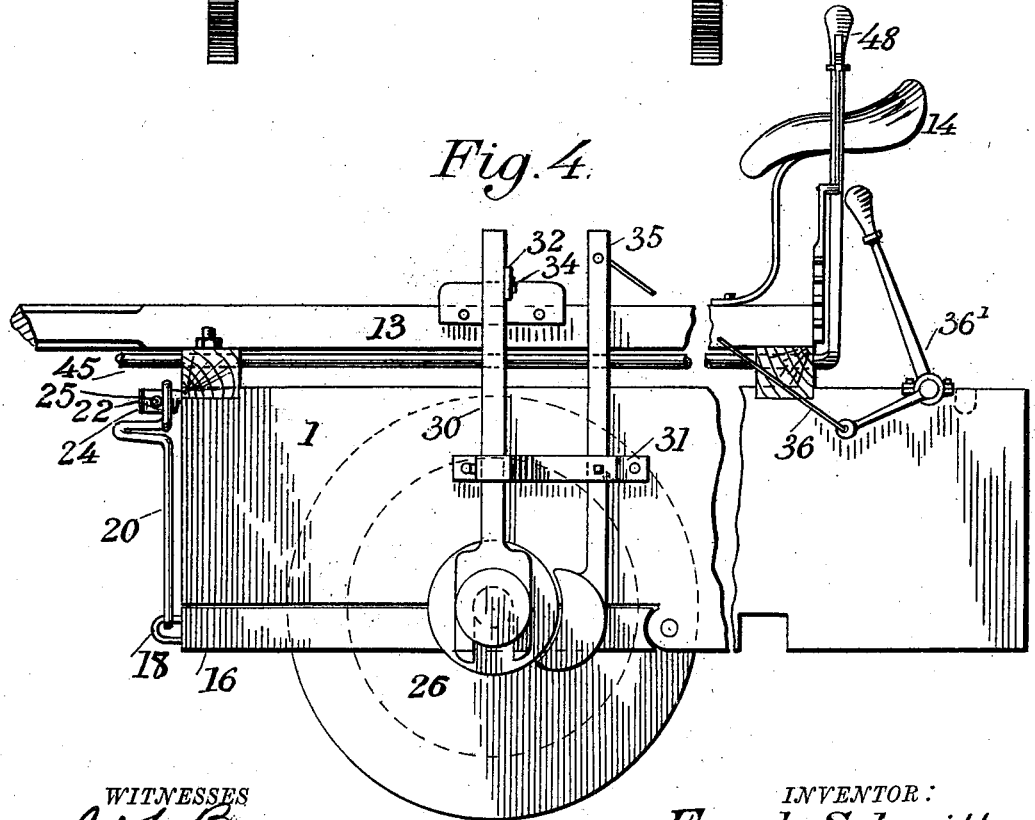
Figure 5:
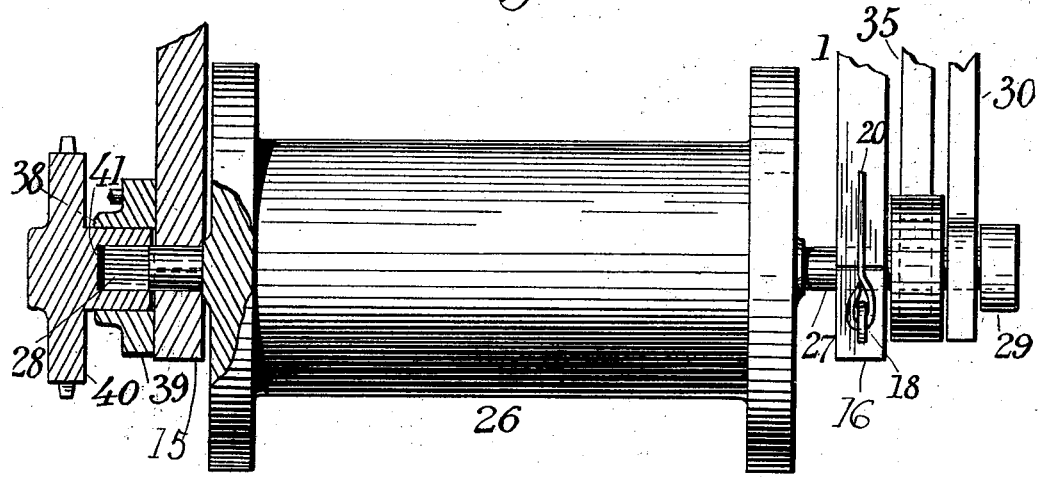
Figure 6:
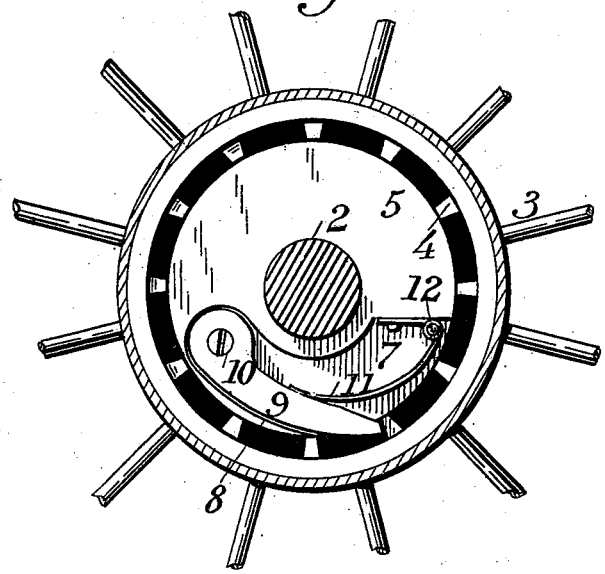

In the accompanying drawings, Figure 1 is a side elevation; Fig. 2, a longitudinal section; Fig. 3, a front elevation; Fig. 4, a partial side elevation showing the shifting mechanism in the winding-drum and the brake mechanism; Fig. 5, a partial section taken through the winding-drum and showing the clutch mechanism, and Fig. 6 a detail view of the clutch mechanism that locks the traction-wheel to the axle.

The numeral 1 designates the frame of the machine, which is mounted on an axle 2, the latter being in turn mounted in traction-wheels 3. The hubs of the wheels are recessed and provided with the circumferentially-disposed teeth 4. There are two collars 5, which are securely connected to the axle, and each is cut away at 7, thereby providing a shoulder 8, and a dog or pawl 9 lies in this cut-away portion, being pivoted on the pin 10. The free portion of the dog projects out upon the periphery of the collars.

The numeral 11 designates a spring which is located in the recess and has one portion connected to the collar, another portion coiled loosely around a pin 12, and a free end bearing against the dog, so as to keep the latter normally against the shoulder of the collar. The collar is of slightly smaller size than the recess in the wheel, and the toes of the dog or pawl are adapted to engage with the circumferentially-disposed teeth of the hubs when the traction-wheels are turned forwardly, as when the machine is advancing, but when the machine is backed the dogs will ride idly on said teeth.

The numeral 13 designates a draft-tongue connected to the frame, and the driver's seat 14 is carried on the rear end of said tongue. At the lower forward portion of the frame there are two pieces or members 15 and 16, which have their rear ends pivoted to the frame. The forward ends of these pieces are provided with eyes 17 and 18, and locking-irons 19 and 20 are interlocked with the eyes and also have loops or eyes at their free ends, as shown at 21 and 22. There are projecting pieces 23 and 24 connected to the frame and adapted to pass through the loops 21 and 22.

The numeral 25 designates a locking-bar made in the shape of a spring-cotter, which passes through the projecting pieces 23 and 24 and prevents the locking members from becoming detached. There is a winding-drum 26, which is carried by a shaft or spindle 27, having a squared end 28 and formed at its other end into a peripherally-recessed head 29. The spindle is journaled both in the hinged members or pieces and the frame, and hence it will be observed that when said pieces are drawn down the spindle and drum can be removed and another one substituted therefor, if desirable. There is a shifting-lever 30, pivoted on a bracket 31, connected to the frame and having a lower forked end which is received in the recessed portion of the head of the spindle just described. A locking-bar 32 is pivoted to the upper end of said locking-lever and provided with notches 33, adapted to engage with a catch-plate 34, connected to the pole or tongue. It will be seen that the lever can be shifted to move the drum and the spindle or shaft laterally and lock the same. At 35 I have shown a brake-lever which is pivoted to the bracket and has a lower end adapted to contact with the head of the spindle. There is a pull-bar 36 connected to this brake-lever, and said pull-bar extends back near the driver's seat and connects with a bell-crank lever 36', which is within easy reach of the driver. Connected to the right-hand side of the frame is a box 38 and a bracket 39.

The numeral 40 designates a sprocket-wheel which is journaled in the bracket and the box and has an inner recessed clutch 41, adapted to receive the squared end of the spindle that carries the drum.

The numeral 42 designates a large drive-sprocket which is carried by the axle, and a sprocket-chain 43 runs over this sprocket and the smaller one, whereby the drum can be driven. A tension-roller 44, journaled to the frame, serves to keep the sprocket-chain under proper tension.

The numeral 45 designates a rock-shaft which is journaled to the under side of the tongue or pole and carries at its forward end a sheave-block 46, in which there is a sheave 47, adapted to serve as a guide for the wire being reeled in. Connected to the rear end of the rock-shaft is a controlling-lever 48, carrying the usual pawl mechanism, adapted to engage with a toothed segment in the ordinary manner. This lever is immediately adjacent to the driver's seat, so that the driver can operate the same and turn the wire-guide, thereby evenly feeding the wire along the drum as it is reeled on the latter.

The numeral 49 designates a wire-reel of ordinary construction provided with the usual shaft or spindle and journaled in the machine-frame back of the driver's seat. There are two locking-catches 50 and 51, which are pivoted to the machine-frame and adapted to retain the shaft in its bearings.

The operation is as follows: When it is desirable to put up or construct a fence, a wire-reel is put in position, and as the machine is driven forward the wire automatically pays out and can be stapled to the post. When the wire of one reel has been consumed, another reel can be substituted for it. If it is desirable to reel in or take up the wire of a fence which has been taken down, the strand of wire is first fed through the wire-guide at the front of the machine and then connected to the winding-drum. The shifting or locking lever is moved so that the squared end of the spindle of the drum is made to clutch with the small sprocket. When this happens, the wire is wound on said drum, the driver meanwhile operating the controlling-lever and guiding the wire evenly along the drum. The brake-lever can be used whenever desirable to check the rotation of the winding-drum, so that the wire will be wound tightly thereon. After one winding-drum has been filled with wire the same can be removed, as before described, and another substituted therefor. Should the machine be backed, the dog will ride idly over the wheel and the winding mechanism not be operated.

Having thus described my invention, what I claim as new, and desire to secure by Letters Patent, is—

1. In a fence-wire machine, the combination with a machine-frame and traction-wheels therefor, of members hinged to the said frame at opposite sides thereof and having their free portions terminating at the ends of the frame, locking members hinged to the aforesaid members and extending against the ends of the frame, said locking members being provided with eyes, independent apertured projecting pieces secured to the frame and adapted for reception in the eyes of the locking members, and a single locking-bar passing through the apertured pieces and securing the locking members in position.

2. In a fence-wire machine, the combination with a machine-frame and traction-wheels, of a winding-drum journaled in said frame, an operative connection between said drum and the traction-wheels, a rock-shaft journaled to the frame, a wire-guide carried by the rock-shaft, and means for holding the rock-shaft in adjusted position.

3. In a fence-wire machine, the combination with a machine-frame and traction-wheels, of a winding-drum carried by said machine-frame, an operative connection between said winding-drum and the traction-wheels, a longitudinally-extending rock-shaft, a sheave-block carried by said rock-shaft, a sheave mounted in said sheave-block, which sheave and block constitute a wire-guide, and a controlling-lever connected to the rock-shaft.

In testimony whereof I have signed this specification in the presence of two subscribing witnesses.

FRANK SCHMITT.

Witnesses:
S. J. NORMAN,
B. H. WILKEN, Jr.